United States Patent [19]

Michie

[11] Patent Number: 5,488,375
[45] Date of Patent: Jan. 30, 1996

[54] AIRBORNE WEATHER RADAR SYSTEM WITH ICING DETECTION CAPABILIY

[75] Inventor: Terry K. Michie, Olathe, Kans.

[73] Assignee: AlliedSignal Inc., Morris Township, Morris County, N.J.

[21] Appl. No.: 314,555

[22] Filed: Sep. 28, 1994

[51] Int. Cl.⁶ ..................................... G01S 13/95
[52] U.S. Cl. ............................. 342/26; 342/460
[58] Field of Search .............................. 342/22, 26, 460; 340/962

[56] References Cited

U.S. PATENT DOCUMENTS 4,965,573  10/1990  Gallagher et al. ............... 342/26
5,028,929   7/1991  Sand et al. ..................... 342/26

*Primary Examiner*—Ian J. Lobo
*Attorney, Agent, or Firm*—Donald B. Paschburg

[57]  ABSTRACT

A weather radar system with icing detection capability is disclosed. Increased radar system sensitivity is combined with aircraft outside air temperature to determine supercooled liquid water content which leads to icing. The radar system can operate in a rainfall mode only, an icing mode only, or in both modes. Display modes include plan position indicator and range height indicator configurations.

8 Claims, 4 Drawing Sheets

AIRBORNE WEATHER RADAR SYSTEM WITH ICING DETECTION CAPABILITY

BACKGROUND OF THE INVENTION

This invention relates generally to an arrangement for remotely detecting atmospheric conditions conducive to hazardous ice formation on the exterior of aircraft when in flight. More particularly, this invention relates to an airborne weather radar system having the capability for remote detection of icing conditions. Still more particularly, this invention relates to an airborne weather radar system having increased sensitivity and cooperatively arranged with an air temperature sensor for detecting super-cooled liquid water (SLW) which causes hazardous ice formation.

A substantial problem exists for aircraft flying under conditions conducive to ice formation (icing) on the exterior of the craft. Icing effects on aircraft include decreased lift, decreased thrust, increased drag, increased weight, and increased stalling speed, all of which can result in icing related accidents and, indeed, fatalities. At present there is no airborne equipment available to remotely detect icing conditions. Pilots rely on weather briefings, aircraft de-icing equipment on some aircraft, and pilot training to analyze weather conditions and develop techniques to evade icing conditions once encountered. Unfortunately, weather conditions change rapidly and many icing conditions are so localized that weather briefings are of little significance. Many light aircraft have inadequate or no de-icing equipment. Additionally, these aircraft generally do not have the power to stay airborne when covered with ice. Finally, pilot training is generally less than desireable so that ice build-up conditions occur before being realized by the pilot.

Generally, icing conditions are defined as those conditions where there is visible moisture and the temperature of moisture droplets, or the temperature of the aircraft's surface, is at or below freezing. This definition is not very helpful unless moisture and low temperature conditions can be verified remotely. SLW droplet size is generally in the area of 10 to 200 micrometers in diameter. These small droplets are not detectable by presently available airborne weather radar systems which are designed with a minimum threshold that will detect droplets that are typically 10 millimeters in diameter with rainfall rates starting at 0.7 millimeters per hour. This is in consideration of the fact that airborne weather radar systems operate on the premise that large rainfall rates are associated with hazardous turbulence. Therefore, the system design is optimized for such higher rainfall rates. The icing hazard, on the other hand, is caused by cloud moisture at negligible or zero rate of precipitation which is below freezing temperatures.

U.S. Pat. No. 5,028,929 which issued to Sand and Kropfli on Jul. 2, 1991 relates to a dualfrequency icing hazard detection radar for aircraft. The arrangement covered by the patent compares the attenuation characteristics of SLW at two diverse microwave frequencies, i.e. using two radar systems. The difference in attenuation is proportional to the SLW content. This knowledge, together with the knowledge of the outside aircraft temperature, provides the ability to detect icing conditions. There are several problems associated with this approach: (1) the two radar systems must be calibrated very accurately in terms of sensitivities relative to each other and in terms of their illumination size and location in space; (2) short path lengths within the icing conditions causes errors in the SLW measurement; (3) the SLW droplet sizes must conform to the Rayleigh scattering criteria (they must not be too large) or errors are created; and (4) the hardware is complex and costly, especially for light aircraft which need the most protection against icing conditions.

The present inventor is aware of the following references relating generally to ice formation on aircraft: "The Estimation of Cloud Parameters By Radar", by D. Atlas, *Journal of Meteorology*, 11, pp. 109–317, 1954; "Statistical Study of Aircraft Icing Accidents" by J. Cole and W. Sand, *American Institute of Aeronautics and Astronautics*, 10 pp., 1990; "A Flight Investigation of the Meteorological Conditions Conducive to the Formation of Ice on Airplanes" by W. Lewis, *NACA TN* 1393, 50 pp., 1947; and "Radar Reflectivity of Cumulus Clouds" by H. Sauvageot and J. Omar, *Journal of Atmospheric Oceanic Technology*, 4, pp. 264–272, 1987.

SUMMARY OF THE INVENTION

One object of this invention is to provide an aircraft mounted icing avoidance arrangement particularly for light to medium aircraft. The avoidance aspect of the arrangement is emphasized because detection of SLW is of a probabilistic nature. That is to say, probable icing conditions are detected from a remote location so as to enhance the ability to avoid said conditions.

Another object of this invention is to combine icing detection capability with the capability of conventional airborne radar systems to detect rainfall of various rates.

Still another object of this invention is to display icing areas of a flight path on a multicolored display in a conventional plan view, or as a range versus height view. The icing areas are displayed in a color different than the conventional weather radar colors which depict various rainfall rates.

Yet another object of this invention is to provide an airborne radar system which gives the pilot the ability to select the following modes: rainfall only, icing only, or both. The desired mode will depend on weather conditions, time of the year, etc. In this regard, it is noted that cumulus clouds may generate heavy rainfall and the associated turbulence threat combined with isolated icing areas caused by moisture being lifted into cold altitudes.

In accordance with the above objects, an airborne X-band weather radar system is contemplated, wherein the sensitivity versus time characteristic is modified while in the icing detection mode. The radar reflectivity factor Z (a measurement of radar sensitivity) is a function of particle diameter and the summation of the particles per unit volume. For cloud detection, the factor Z has been shown to be a reasonable estimate of the liquid-water content. In this regard, note the dissertation by D. Atlas, Supra.

Further, an outside air temperature input to the radar system is provided to detect below freezing atmospheric conditions. It is assumed that temperature is relatively constant at a given altitude. With an estimate of liquid water content and the air temperature, the radar system can make an adequate estimate of the SLW content of a cloud, and therefore provide icing avoidance information to the pilot of the aircraft. False alarms can be caused by mixed phase atmospheric conditions, where ice crystals (or snow) are mixed in with the SLW, or in some cases moderate icing conditions (low SLW) will be below the detectable Z level of the radar system. In general, the described arrangement is to be used to circumvent icing conditions, as opposed to continuing on a present flight path.

The icing areas are shown in white, for example, on a color display to distinguish them from the normal rainfall colors. The displayed areas give the pilot the directional and size information needed to avoid the icing threat. The controls to select icing modes are located on the display as is conventional in the airborne weather radar art.

DETAILED DESCRIPTION OF THE INVENTION

The icing hazard that the present invention detects is caused by liquid atmospheric water particles having sufficient water content in a temperature range that causes ice to form on an aircraft as it flies through the atmosphere. When water in the atmosphere is at temperatures below freezing it is referred to as super-cooled liquid water (SLW). SLW is known to exist at temperatures as cold as −40° C. Under these conditions, the movement of the aircraft is sufficient to trigger immediate freezing, resulting in ice buildup on the exterior aircraft surfaces.

The present invention relies on the measurement of radar reflectivity (Z) measured in $mm^6/m^3$ as a function of the liquid water content (W) measured in $g/m^3$. The early research on the estimation of cloud parameters by radar was done by D. Atlas, Supra. Atlas' work can be summarized as follows: Z can be expressed as a function of W, $d_0$ (the median volume diameter of SLW particles), and G (a coefficient which increases with the spread of the particle-size distribution). In natural clouds, Atlas found that there is a preferred value for G (1.35) and a correlation between $d_0$ and W to be made from a radar measurement of Z alone, as follows:

$$Z = 2.58 \, d_0^3 \, W \times 10^{-6}. \tag{1}$$

This allows measurement of combinations of W and $d_0$ and a standard error of 21% for W for a given $d_0$, and a standard error of 6.5% for $d_0$ for a given W, according to Atlas. More recent work by Sauvageot and Omar, Supra, has confirmed Atlas' work.

Figure 1:
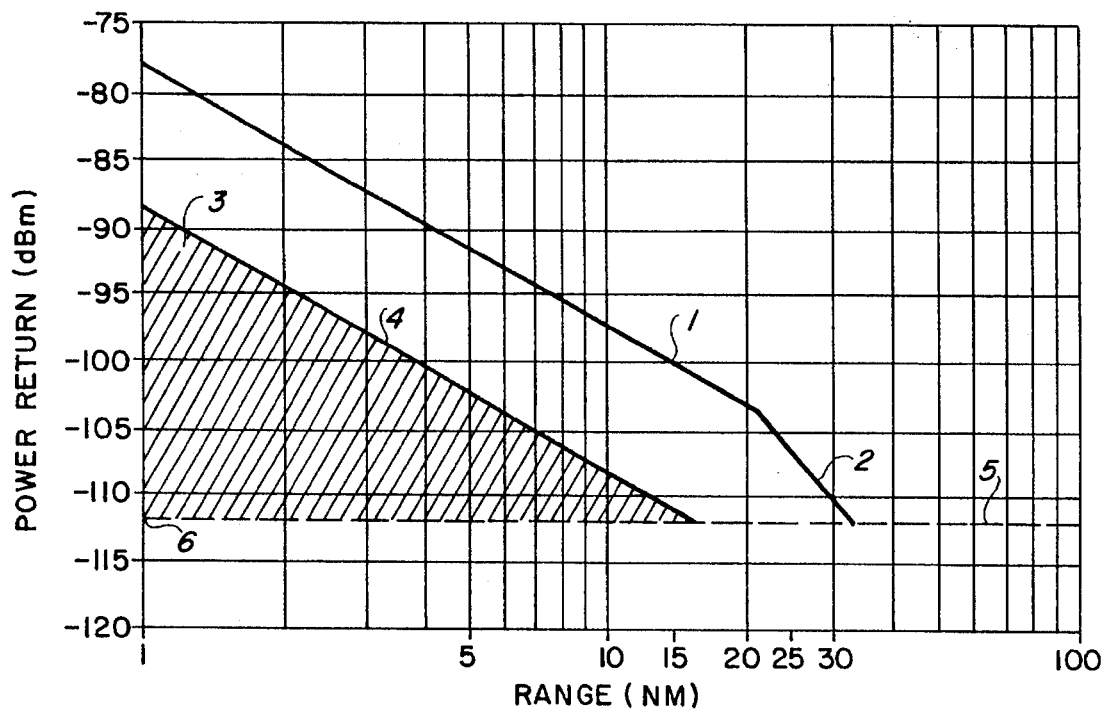
FIG. 1 is a graphical representation illustrating radar sensitivity as a function of range for both the rainfall minimum sensitivity and the icing sensitivity area.

With reference to FIG. 1, the power level to be detected (dBm) is plotted on the ordinate of the graphical representation, while range in nautical miles (NM) is plotted on the abscissa. Curve 1 represents the standard sensitivity versus time (or equivalently range) characteristic (STC) for a conventional airborne weather radar system. The slope of curve 1 is 6 dB/octave such that radar system returns from equal rainfall rates, at different distances, will be detected at the same intensity. This is due to the fact that reflection power varies inversely as the square of the distance.

Curve 2 (a continuation of curve 1) has twice the slope/octave of curve 1 because a typical weather disturbance becomes antenna beam filling at approximately 22 NM. Reflection power varies inversely as the fourth power of the distance when the weather disturbance is not beam filling. Curves 1 and 2 form the minimum sensitivity for a weather radar system to detect light raining (shown in green, for example, on a display unit). This level of radar reflectivity Z is approximately +20 dBZ.

Line 5 represents the maximum sensitivity of the radar system (−112 dBm). This means that when the STC curve runs out at 32 NM, the radar system is at maximum sensitivity and thus becomes unable to show the correct rainfall rate at any further distance, i.e. the radar is uncalibrated beyond 32 NM. Area 3 in FIG. 1 represents the sensitivity levels versus range that are desired for detection of icing conditions. The upper boundary 4 of area 3 is representative of +10 dBZ. The lower boundary 5 of area 3 represents maximum sensitivity.

With reference to equation 1, it can be determined what the aforementioned limits mean in terms of W and $d_0^3$. The product of these two quantities is $3.88 \times 10^6$ for +10 dBZ. The level of an icing hazard is generally considered severe for $W > 1.0 \, g/m^3$. In this regard, reference is made to W. Lewis, Supra.

Therefore, for this level of water content, the mean particle diameter is 157 micrometers. Thus, the upper detection level for severe icing is set at approximately 1 $g/m^3$ and 157 micrometer particle diameter. This detection level is constant for ranges out to approximately 17 NM. it is desirable to have this upper limit of the icing detection area because higher reflectivities are most probably caused by ice crystals, snow, etc. which do not pose the icing hazard. Lesser icing hazards will be detected at other points in area 3 in FIG. 1.

The minimum detectable level is represented by point 6 in FIG. 1. At this point, the detection level is −14 dBZ, which generally represents a moderate icing hazard. Point 6 is at a range of 1 NM. Therefore, the detection of moderate icing hazards is very limited in range. This is more reason to emphasize that the use of this invention is intended for avoidance purposes only, as aforenoted.

Figure 2:
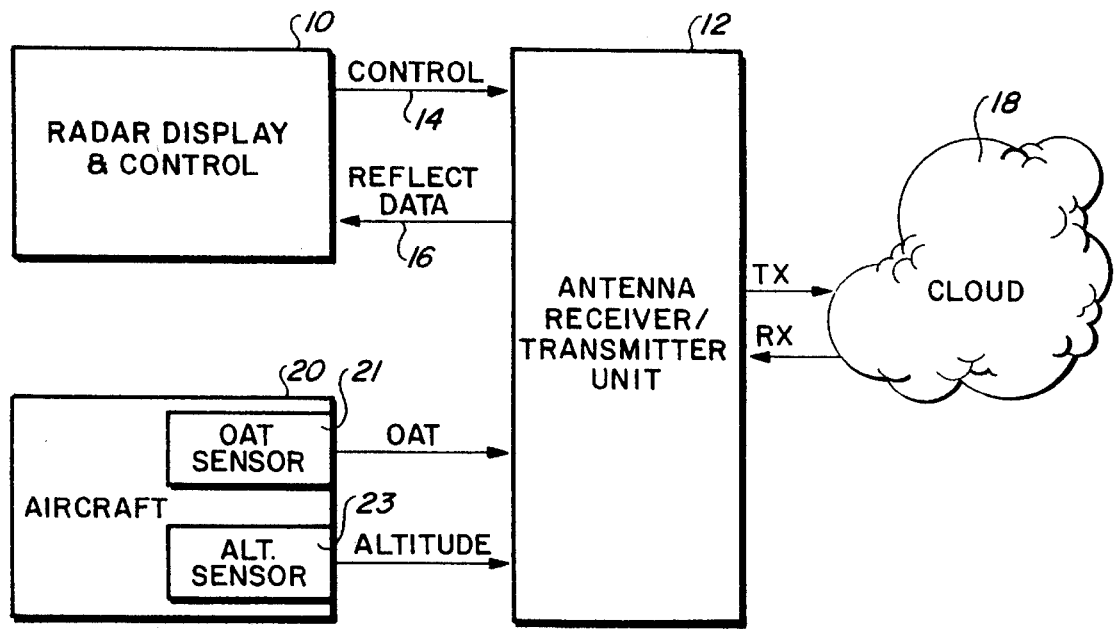
FIG. 2 is a block diagram generally illustrating a radar system for implementing the invention with its component interconnections and external inputs.

The preferred embodiment of the invention is generally illustrated in FIG. 2. An airborne radar system has two main units, i.e. a display and control unit 10 and an antenna/receiver/transmitter (ART) unit 12. Units 10 and 12 are connected by a serial control bus 14 which applies control data from display and control unit 10 to ART unit 12 in accordance with a desired mode, i.e. gain setting, tilt setting, etc. A serial reflectivity bus 16 applies reflected rainfall level data and icing detection data from ART unit 12 to display and control unit 10 as a function of range and either azimuth or elevation angle. ART unit 12 transmits X-band pulses (TX) into space. When a weather formation or cloud 18 of SLW or rainfall is in the path of the pulses, reflection pulses (RX) are reflected back and received by ART unit 12 with an amplitude that corresponds to the Z level as expressed in equation (1). ART unit 12 is mounted on an aircraft 20 and receives two inputs from the aircraft, i.e. an analog outside air temperature (OAT) from a sensor 21 and an aircraft altitude signal from a sensor 23 mounted on the aircraft.

Figure 3:
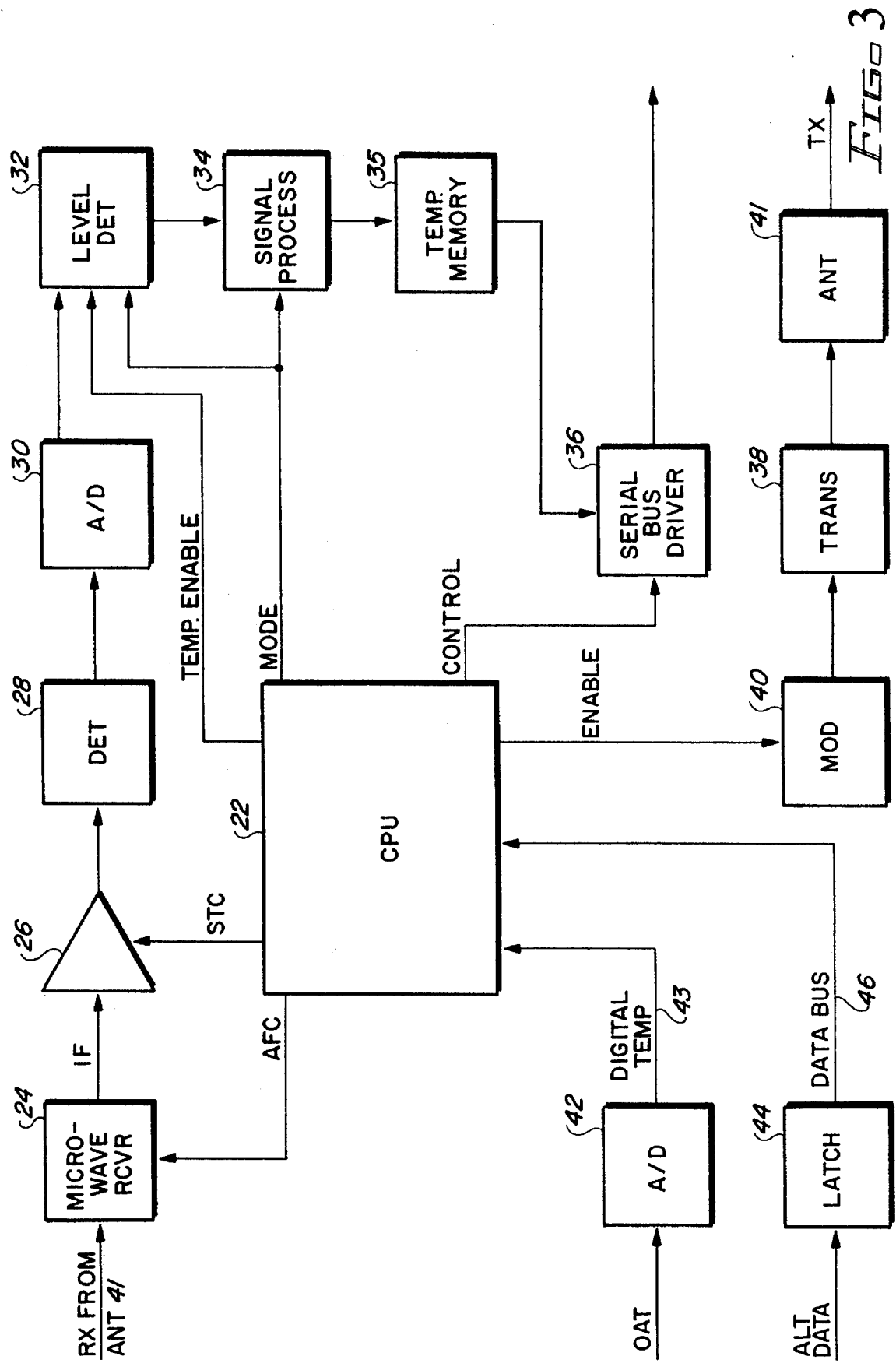
FIG. 3 is a block diagram particularly illustrating an antenna/receiver/transmitter Unit (ART) according to the present invention and illustrating the functional blocks of the ART and their interconnections.

With particular reference now to FIG. 3, ART unit 12 includes a central processing unit (CPU) 22. Reflection pulses RX are received by a microwave receiver 24 via an antenna 41 which amplifies the pulses and downconverts the frequency of the amplified pulses to a 60 MHz IF frequency and provides an IF signal. An automatic frequency control signal (AFC) from CPU 22 tunes receiver 24 to match a transmit frequency. The IF signal provided by receiver 24 is amplified by a variable gain amplifier 26. An STC signal from CPU 22 controls the gain of amplifier 26 so that the sensitivity of the radar system conforms to that described with reference to FIG. 1, depending on whether the radar system is in the rainfall or icing mode. The signal from amplifier 26, which is an analog signal, is detected by a detector 28 and the detected signal is converted to a digital signal by an analog to digital converter (A/D) 30. A level detector 32 separates the level of the digital signal into equivalent display color levels in the rainfall mode, and detects area 3 shown in FIG. 1 when the system is in the icing mode as determined by a mode signal from CPU 22, and provides corresponding signals.

A temperature enable signal from CPU 22 allows the icing level to be detected by detector 32 only if the detected temperature is 0° C. or below. When vertical profile mode and icing modes are selected, the temperature enable signal occurs when CPU 22 determines that the range and elevation angle have crossed into the altitude that has 0° C. temperature. This determination is based on OAT, altitude, range, elevation angle, and adiabatic lapse rate.

A signal processor 34 receives the mode signal from CPU 22 and averages the levels of the signals from level detector 32. This provides a signal to noise enhancement over the number of pulses averaged. Typically thirty-two pulses are averaged and the result is stored in a temporary memory 35 which serially transmits the averaged pulses to a serial bus driver 36. Serial bus driver 36 is controlled by a control signal from CPU 22 to apply reflection data to display and control unit 10 (FIG. 1). Signal processor 34 combines the rainfall levels with the icing level in temporary memory 35 when the radar is in the "both" mode, i.e. rainfall/icing. When in this mode, alternate transmitter pulses are used for the rainfall/icing detection.

A transmitter 38, usually a magnetron (microwave power oscillator), is driven by a modulator circuit 40 enabled by an enable signal from CPU 22 to transmit pulses to antenna 41 which transmits the pulses (TX) into space.

Analog OAT signal from aircraft 20 (sensor 21) is converted by an A/D converter 42 to a digital signal such that it can be read by CPU 22 via a data bus 43. Digital altitude data from aircraft 20 (sensor 23) is latched by a latch 44 and then read by CPU 22 via a data bus 46.

Figure 4:
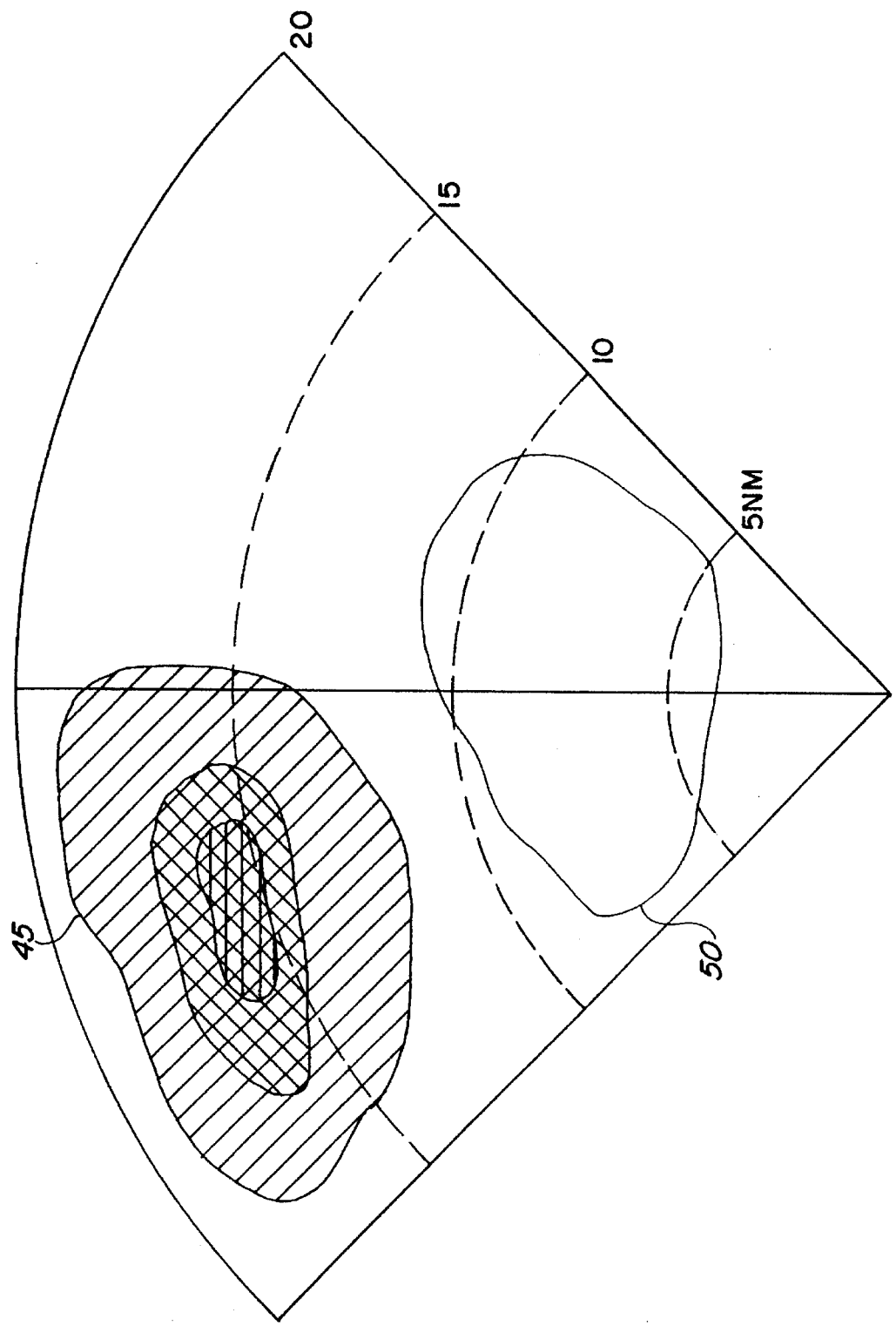
FIG. 4 is a diagrammatic representation of a radar display showing range versus azimuth angle with both rainfall and icing areas depicted.

FIG. 4 is a representation of the display on display and control unit 10 when the radar is in the Plan Position Indicator (PPI) mode. In this mode the coordinates are azimuth and range (NM). The operating mode has both rainfall and icing selected. The rainfall 48 is shown in three different rates. The icing area 50 shows the position and extent of a possible icing hazard.

Figure 5:
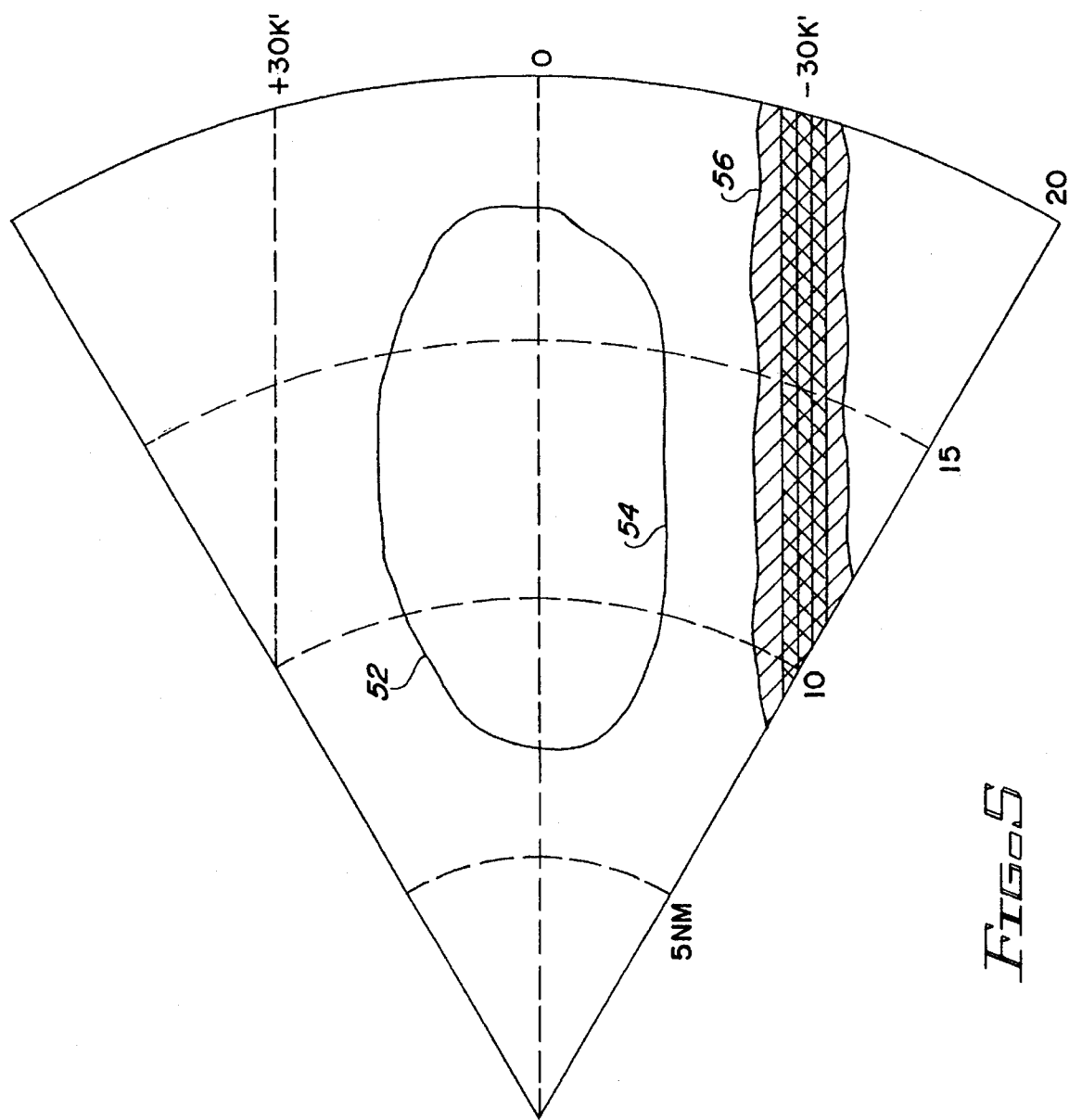
FIG. 5 is a diagrammatic representation of a radar display showing range versus height with an icing area depicted, along with clutter created by the radar beam intersecting the ground.

FIG. 5 is a representation of a stratiform icing weather condition displayed in a vertical profile mode. In this mode the coordinates are elevation and range (NM). The horizontal grids are altitude relative to the aircraft's altitude. An area of icing conditions 52 is shown. Note that below an altitude indicated as 54 the icing ceases. This is the altitude where the temperature is 0° C. The radar antenna beam intersects the ground causing a clutter pattern 56. The aircraft is flying at 30K feet in this representation.

There has thus been described an arrangement in association with an airborne weather radar system for remotely detecting atmospheric conditions conducive to hazardous ice formation on the exterior surfaces of an aircraft when in flight. The airborne weather radar system has increased sensitivity and is arranged with an aircraft mounted air temperature sensor for detecting super-cooled liquid water conditions which cause the hazardous ice formation.

With the above description of the invention in mind, reference is made to the claims appended hereto for a definition of the scope of the invention.

What is claimed is:

1. An airborne weather radar system with icing detection capability, comprising:

display and control means;

antenna/receiver/transmitter (ART) means;

means connected to the display and control means and to the ART means for applying control data from said display and control means to said ART means;

temperature sensor means and altitude sensor means mounted on an aircraft carrying the airborne weather radar system and connected to the ART means fop applying outside temperature and aircraft altitude signals to said ART means;

said ART means transmitting pulses into space and receiving reflection pulses when said transmitted pulses are intercepted by super-cooled liquid water (SLW) and rainfall weather formations, said ART means including a central processing unit (CPU), receiver means fop receiving the reflection pulses, the CPU connected to the receiver means for applying frequency control and sensitivity control signals thereto, whereby the receiver means provides signals tuned to a predetermined frequency, and at a predetermined sensitivity level, depending on which mode of a rainfall mode and an icing mode the radar system is in, and means connected to the receiver means and to the CPU and responsive to the signals from the receiver means, and to a mode signal and a temperature enable signal from the CPU for detecting and separating the signals from the receiver means into rainfall levels and icing levels, with the icing level being detected only if the temperature is below a predetermined level, and for averaging the levels of the detected signals, and for temporarily storing the average signals; and means connected to the display and control means and to the ART means for applying SLW and rainfall data from said ART means to said display and control means which displays the SLW data and the rainfall data so that the rainfall conditions and SLW conditions are distinguished from each other, whereby a pilot of the aircraft is provided with information for avoiding icing caused by SLW conditions.

2. The airborne weather radar system as described by claim 1, wherein the ART means further includes:

means connected to the CPU and to the detecting/separating/averaging/storing means and responsive to a control signal from the CPU for transmitting reflection data to the display and control means.

3. The airborne weather radar system as described by claim 1, wherein the ART means, still further includes:

means for applying the outside temperature signal to the central processing unit;

means for applying the aircraft altitude signal to the central processing unit; and the central processing unit being responsive to the outside temperature signal and the altitude signal for providing the mode and control signals, and the central processing unit providing an enable signal.

4. The airborne weather radar system as described by claim 2, wherein the ART means yet further includes:

modulator means connected to the central processing unit for modulating the enable signal therefrom;

antenna means; and transmitter means connected to the modulator means and responsive to the modulated enable signal for applying pulses to the antenna means which transmits said pulses into space.

5. The airborne weather radar system as described by claim 1, wherein the receiver means includes:

a receiver for receiving the reflection pulses and for converting the frequency of the received pulses to an analog signal at a predetermined IF frequency;

the receiver connected to the CPU and responsive to frequency control signal therefrom for tuning the receiver to match a transmission frequency;

means connected to the receiver for amplifying the analog signal at a predetermined IF frequency therefrom; and said amplifying means connected to the CPU and responsive to the sensitivity signal therefrom so that an amplified analog signal at a predetermined IF frequency provided by said amplifying means has a predetermined sensitivity.

6. The airborne weather radar system as described by claim 1, wherein the means connected to the receiver means and to the CPU and responsive to the signal from the receiver means, and to the mode signal and a temperature enable signal from the CPU includes:

a detector connected to the amplifying means for detecting the amplified analog signal therefrom;

an analog to digital converter connected to the detector for converting the detected amplified analog signal to a digital signal;

a level detector connected to the analog to digital converter and responsive to the digital signal from the converter and to the mode and temperature enable signals from the CPU for detecting and separating the analog signal into rainfall level and icing level signals;

a signal processor connected to the CPU and to the level detector and responsive to the mode signal from the CPU for averaging the rainfall and icing level signals from the level detector and for providing averaged signals;

means connected to the signal processor for combining the averaged signals in a temporary memory; and driver means connected to the CPU, the temporary memory and the display and control means and responsive to a control signal from the CPU for applying the signals from the temporary memory to the display and control means which is responsive to the applied signals for displaying the rainfall and SLW data.

7. The airborne weather system as described by claim 6, wherein:

the airborne weather radar system is in both rainfall and icing modes;

the system is in the plan position indicator mode wherein the display coordinates are azimuth and range;

rainfall is displayed in a plurality of different rates; and an icing area is displayed which indicates the position and extent of a possible icing hazard.

8. The airborne radar system as described by claim 6, wherein:

the airborne weather radar system is in an icing mode;

the icing mode is displayed in a vertical profile mode wherein the display coordinates are elevation and range, with horizontal grids representing altitude relative to the altitude of the aircraft.

* * * * *